May 22, 1945.  R. S. STANFIELD ET AL  2,376,629
CATALYTIC CONVERTER
Filed April 21, 1943   2 Sheets-Sheet 2

INVENTOR
Rowland S. Stanfield
Leonard W. Toolan, Jr.
BY
Harry T. Hutton
ATTORNEY Patented May 22, 1945

2,376,629

UNITED STATES PATENT OFFICE 2,376,629

CATALYTIC CONVERTER

Rowland S. Stanfield, Plainfield, and Leonard W. Doolan, Jr., Cranford, N. J., assignors to Tide Water Associated Oil Company, Bayonne, N. J., a corporation of Delaware Application April 21, 1943, Serial No. 483,968

3 Claims. (Cl. 23—288)

This invention relates to chemical reactions involving the use of contact material and particularly is concerned with converter apparatus adapted for utilizing contact material in situ during recurring cycles of on-stream and regeneration operation. In most contacting reactions and especially in transforming, treating and other hydrocarbon reactions the contact material during an on-stream period of operation to obtain the desired product, becomes contaminated with a carbonaceous deposit which must be removed in a regeneration operation to place the material in condition for a later on-stream operation. When the contact material remains in situ during its use it is subjected in both the on-stream and regeneration operations to temperature fluctuations. Provision must therefore be made for supplying heat to or removing heat from the material in accordance with the requirements of the particular on-stream reaction which is being carried out and after the on-stream operation when air or other oxygen containing medium is supplied to the material to effect a burning of the deposit, varying amounts of heat must be removed in order to prevent a temperature rise which might affect the contact material deleteriously.

In adapting converter apparatus for utilizing the catalyst or contact material in place it is necessary for the most efficient commercial operation to equip the converter with numerous tubes which are interspersed symmetrically throughout the body of contact material in properly spaced relationship. Some of these tubes are provided with apertures for distributing reaction fluid directly through the material while other tubes are provided with apertures for the collection of reaction products from the material. Still other tubes are provided which are imperforate and used for circulating a heat exchange medium in indirect heat exchange relation with the contact material at least during the regeneration period of operation in order to prevent the temperature within the reaction chamber from rising to such an extent that the contact material or associated structural parts of the converter would be impaired by overheating.

Reactant manifolds are provided, one to be in communication with the reaction fluid distributor tubes and one to be in communication with the reaction product collector tubes and, in accordance with engineering expediency, one of these manifolds is disposed directly above the reaction chamber containing the contact material and the other disposed directly below the reaction chamber so that either of the manifolds may be selectively used for supplying reaction fluid or for removing reaction products.

The most effective temperature control within the reaction chamber is found from experience to be had when the heat exchange fluid is circulated in reverse flow in indirect heat exchange relationship with the contact material and the customary commercial adaptation for accomplishing this is the provision of inner open end tubes disposed concentrically within outer closed end tubes and with one open end of the inner tubes spaced somewhat from the closed end of the outer tubes to, in effect, provide an inner channel which is in communication with an outer channel or annulus. The outer heat exchange fluid tubes extend upwardly through the lower reactant manifold and have their closed ends disposed adjacent the top of the reaction chamber and their lower open ends in communication with an upper heat exchange fluid manifold which is disposed directly beneath the lower reactant manifold. As mentioned above, the upper open ends of the inner tubes are disposed adjacent the closed ends of the outer tubes while the lower portions of the inner tubes extend through both the lower reactant fluid manifold and the upper heat exchange fluid manifold and have their lower open ends in communication with a lower heat exchange fluid manifold disposed directly beneath the upper heat exchange fluid manifold.

This arrangement of superposed manifolds provides for economy in construction and substantial saving in construction materials since the bottom wall of the reaction chamber may serve as the top wall of the reactant manifold while the bottom wall of the reactant manifold may serve as the top wall of the upper heat exchange fluid manifold and under normal and proper operating conditions both of these walls are at substantially the same temperature since the heat exchange medium entering the upper heat exchange fluid manifold after passing through the reverse flow tube assemblies will be at substantially the same temperature as that obtaining in all zones of contact material within the reaction chamber. In order to maintain all zones of the contact material at substantially the same temperature particularly during the regeneration period it has been believed necessary heretofore to provide heat conducting elements usually in the form of fins which radiate outwardly from the outer heat exchange fluid tubes into all zones of the contact material in order that excess heat will be uniformly conducted from the material during this exothermic period of operation. To accomplish this prior practice has established that the fins extend the full length of the tubes and particularly that they extend to a point directly adjacent the bottom wall of the reaction chamber in order that localized overheating in this area is prevented which would consequently overheat the bottom wall of the reaction chamber.

It is essential that the reactant manifold and upper heat exchange manifold be maintained in sealed relationship since any intermingling of the heat exchange fluid with the reaction fluid should be prevented, for, depending on the particular fluids used in the operation, explosive mixtures might occur. To this end the outer heat exchange fluid tubes are rigidly secured, preferably by rolling the walls of the tubes into the walls forming the reaction fluid manifold. It will be seen then that any overheating of the lower reaction chamber wall would cause varying degrees of distortion among the several structural parts of this reactant manifold and other associated parts of the converter.

The finned heat exchange tubes utilized commercially have met with complete success in effecting the proper temperature control. However, a converter of this general construction presents a very great problem in removing the contact material from the reaction chamber after it has been used over extended periods of time and has lost activity to the extent that it must be removed and replaced by fresh material. Various expediencies have been resorted to in effecting the removal of the material but the problem has not heretofore been completely overcome without partially dismantling the converter for the reason that the above generally described interior design of the reaction chamber was believed to be essential for the proper functioning of the converter and in particular that it was essential to have the heat exchange fins extend to the bottom wall of the reaction chamber in order to control the temperature of the contact material in that area as well as to prevent overheating of the reaction chamber wall. Consequently the numerous tubes and fins required for the reaction chamber decreased substantially the space within the chamber which could be used for contact material and since the numerous tubes had to be symmetrically arranged therein, it has been unfeasible to reach all zones of the contact material with tools to effect its removal.

One object of the invention is to provide a converter for utilizing a stationary body of contact material in cyclic operation and which is adapted for highly efficient commercial operation. Another object is to provide zones adjacent the bottom of the reaction chamber of the converter which are relatively free of structure giving ready access for removal of contact material. Another object is to control effectively the temperature of these zones in order to prevent overheating of the contact material.

In order to illustrate the invention and the manner of its operation reference may be had to the accompanying drawings wherein similar parts are indicated by like reference characters in which.

Figure 1:
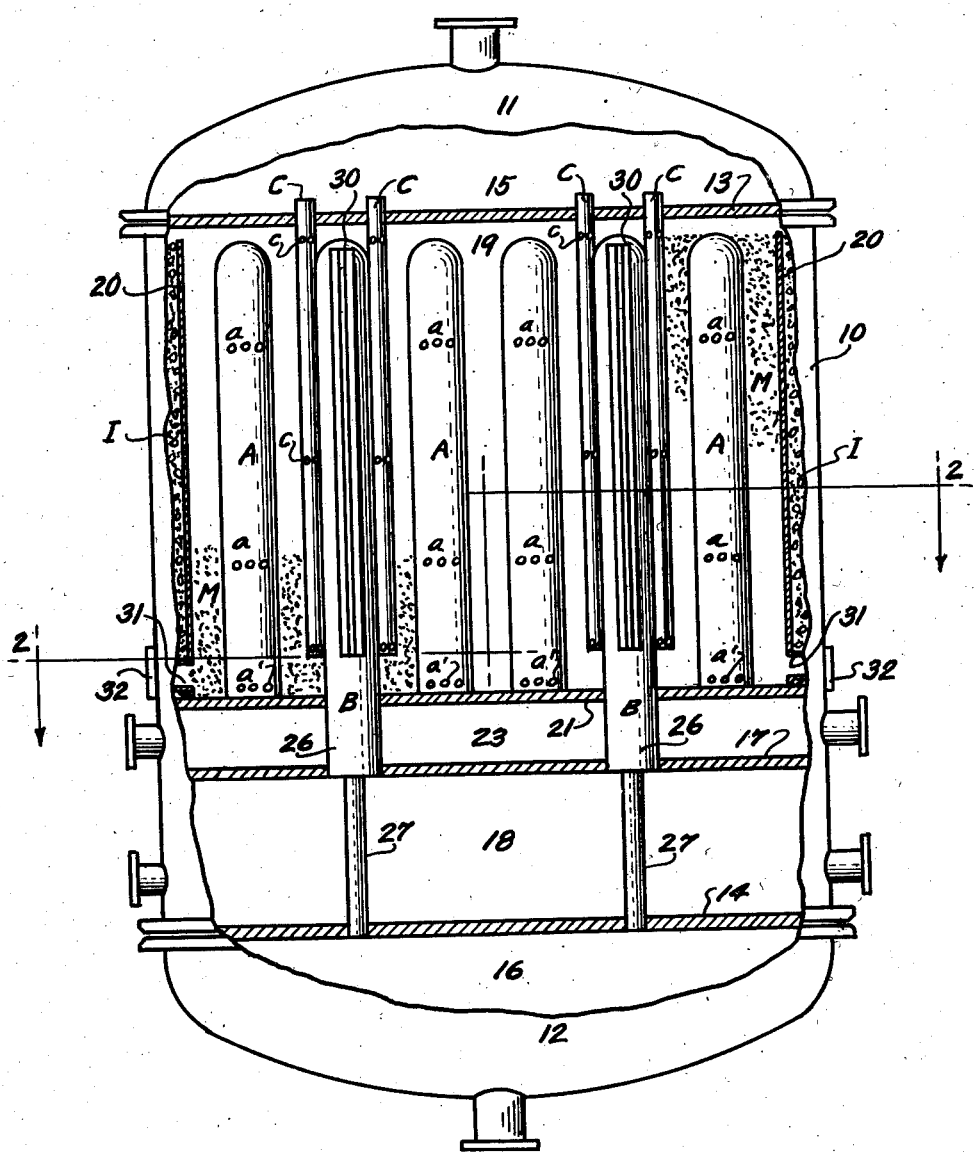
Fig. 1 is generally a diagrammatic view of a converter with a portion of the casing removed to show the general design of the tubes assembled therein and details which are sectioned.

The converter disclosed in Fig. 1 comprises a cylindrical casing generally indicated at 10, which may be provided with an outer covering (not shown) of suitable heat insulating material. The casing has upper and lower closure members 11 and 12, respectively, each of which is provided with flanges to cooperate with upper and lower flanges on the casing to facilitate the assembly of the converter. In assembling the converter an upper transverse partition 13 and a lower transverse partition 14 will be secured in fixed position between the upper and lower closure members 11 and 12, respectively, and the casing 10, providing top and bottom fluid manifolds 15 and 16. A transverse plate 17 is disposed above and in spaced relation with the lower transverse partition 14 and is rigidly secured, for example, by welding to the interior wall of the converter casing, forming with the lower transverse partition 14 a chamber 18 directly above the lower chamber 16. A reaction chamber 19, which in operation is to be filled with solid contact material M, in the form of bits, fragments or molded pieces and used to promote, enter into or in any way assist in the desired reaction, is formed by positioning an inner shell 20 within the casing 10 providing a space around the shell which may be filled with suitable heat insulating material I. A tube sheet 21 is secured to the lower edge of the shell 20, preferably having its outer edge spaced slightly from the inner walls of casing 10 to permit movement relative to the casing under strains of contraction and expansion caused by temperature changes within the reaction chamber. The tube sheet 21 forms with the plate 17 a chamber 23 directly below the reaction chamber and, when necessary, suitable braces may be provided between these plates to support the weight of the contact material M within the reaction chamber.

The upper partition 13 and tube sheet 21 are apertured to provide communication between the reaction chamber 19 and the adjacent chambers 15 and 23, which provide reaction fluid chambers adjacent the top and bottom of the reaction chamber for the supply thereto of reaction fluid and the removal therefrom of reaction products. For the supply of reaction fluid to the contact material within the reaction chamber, distributor tubes A are provided to be in communication with one of the fluid manifolds and, as shown, are secured in the tube sheet 21 to communicate therethrough with the manifold 23. Collector tubes C are provided for the removal of reaction products from the contact material and, as shown, these are secured in the upper partition 13 to be in communication with the fluid manifold 15. For the most effective operation the tubes A are apertured at $a$ and the tubes C are apertured at $c$ and the apertures are arranged in areas or zones which are spaced lengthwise of each tube. Heretofore, in the prior art as exemplified by Houdry et al. Patent 2,283,208, issued May 19, 1942, the apertures $a$ are positioned in areas spaced from the ends of tubes A and the apertures $c$ are positioned in areas at the ends and generally centrally of tubes C in order that the reaction fluid from the tubes A is distributed in predetermined paths upwardly and downwardly of the contact material from the apertured areas $a$ to the apertured areas $c$ in tubes C. In order to control the temperature of the contact material M and the adjacent structural parts of the converter, a heat exchange medium, such as fused salts, mercury or diphenyl which undergoes only small temperature changes during use, is circulated through nested reverse flow tube assemblages B, which are made up of outer tubes 26 having their closed ends positioned adjacent the upper partition 13 and their open ends secured in apertures in plate 17, to be in communication with the chamber 18 and inner open end tubes 27, which have one open end positioned adjacent the closed end of the outer tube 26 and their lower open ends secured in apertures in the lower plate 14 to be in communication with the lower chamber 16. In operation the heat exchange fluid will be circulated in heat exchange relation with the contact material by supplying it to one of the chambers 16 or 18 for passage upwardly of the outer or inner tube and removed from the other tube of the assembly into the other chamber. Preferably the fluid will be supplied to the lower chamber 16 which provides a heat exchange fluid manifold for the inner tubes to pass upwardly through the inner tubes 27 and into the outer tubes 26 from which the fluid will be directed to the chamber 18, which provides a manifold for the outer tubes.

Figure 2:
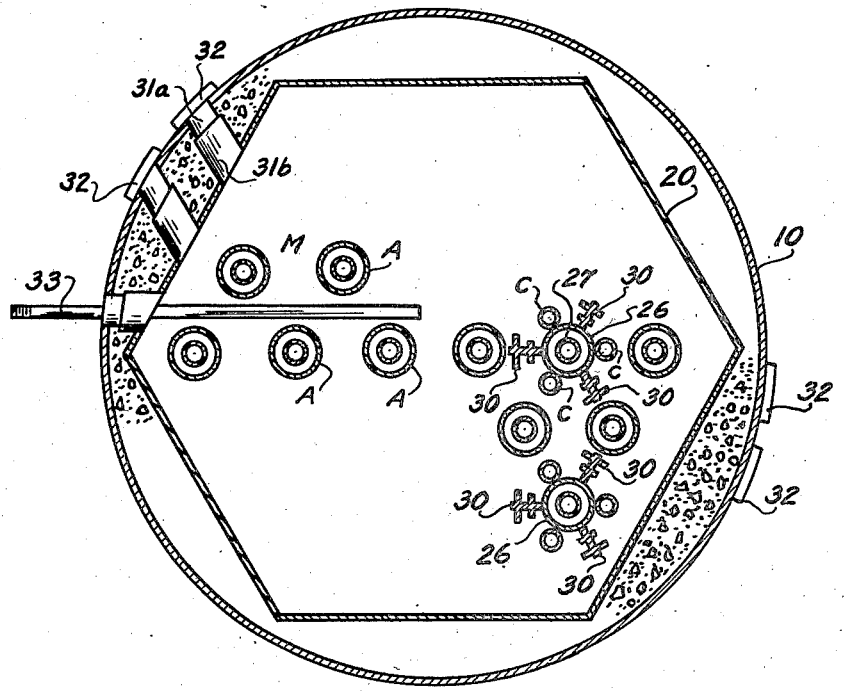
Fig. 2 is a transverse sectional view on two levels as indicated by the line 2—2 of Fig. 1, with the contact mass and some tubes removed for the purpose of clarity.

The above described sets of reaction fluid and heat exchange fluid tubes are by preference arranged in accordance with the disclosure of the aforementioned patent to E. J. Houdry et al. and, as indicated in this patent, the reaction product collector tubes C will be secured along their side walls to the side walls of the outer heat exchange tube 26 to assist in the temperature control. The main temperature control is effected by means of fins 30 which are also secured to the outer tubes 26 and extend therefrom into the contact material and, as indicated in Fig. 2, at the right hand side thereof three fins are shown attached to the outer tubes 26 spaced between collector tubes C. Referring again to Fig. 1 the fins 30 extend along the outer tubes 26 and terminate at a point above the tube sheet 21 providing a space between the lower ends of the fins and the tube sheet 21 which provide zones of contact material which have no fin structure therein and the temperature of which is consequently not controlled by any fin structure. As also indicated in Fig. 1, the collector tubes C terminate above the tube sheet 21 in substantially the same plane as the fins 30 providing additional zones of contact material above the tube sheet. In order to control the temperature of the contact material in these zones directly above the tube sheet 21, additional apertures a' are provided in the distributor tubes A in an area directly adjacent the tube sheet which cooperate with the apertures c at the lower end of the collector tubes C to provide a short path of flow for the reactant fluid between these tubes. For example, during regeneration air will be distributed from the bottom row of apertures a' in tubes A to the lower apertures c in tubes C in a short path of flow and the length of this path will be such as to limit the volume of heat generated in this area, so that the temperature is maintained below a temperature which would injure the catalyst directly above the tube sheet, before the regeneration fumes are collected by the lower apertures c. This short path of flow through the zones of catalyst directly above the tube sheet 21 supplements the heat exchange fins 30 in the body of contact material and is effective to maintain the temperature below that which would adversely affect the catalyst or cause any distortion of the tube sheet 21 and associated parts. In order to provide access to the zone of contact material directly above the tube sheet 21 a plurality of sleeves 31 extend from the outer wall of casing 10 through the insulating material I and the shell 20 to be in communication with the reaction chamber 19. During operation of the converter these sleeves will be sealed by caps 32 which may be removed when it is desired to gain access to the reaction chamber.

Referring again to Fig. 2, which is a horizontal sectional view taken on two levels of Fig. 1, the left half of the figure being on a line below the fins 30 and the collector tubes C while the right half of the figure is on a line through the fins 30 and collector tubes C. From an inspection of the right half of the figure, it will be seen that the fins 30 and the various tubes take up a substantial volume of the catalyst space and that there are no well defined or uninterrupted paths from the outer casing 20 of the converter to the interior of the reaction chamber which would permit a tool of any kind to be readily inserted for removing the contact material from the reaction chamber. At the left side of the figure which shows the contact material zones below the ends of fins 30 and tubes C, it will be seen that a substantial increase of volume of the reaction chamber is had when the fins 30 and collector tubes C terminate a distance above the tube sheet 21 and that definite paths are provided between the distributor tubes A for removing the contact material. The sleeves 31 heretofore referred to are preferably constructed of two telescoping sections 31a and 31b which are respectively secured to the casing 10 and the inner shell 20 in a manner to permit some relative movement between the shell and casing. After removal of caps 32 suitable tools may be inserted through the sleeves into catalyst zones between the rows of tube A for removing any material from the tube sheet 21.

After the converter has been in operation over a long period of time and it is desired to remove the contact material or catalyst from the chamber 19, the material may be most effectively removed from the reaction chamber after removal of the sealing caps 32 by applying air pressure to the top of the catalyst bed through the fluid manifold 15 to force a substantial portion of the material out through the sleeves 31. It will not be possible to remove all of the material in this manner since, depending on the angle of repose of the material, a bed will be formed with its high point generally centrally of the reaction chamber and tapering toward the outlet sleeves 31. In order to remove the remaining portion of the material, suitable tools may be inserted through the sleeves 31 which, as indicated, are positioned in line with the zones of material between the tubes A. Preferably, however, the material will be removed by using one or a plurality of eduction conduits 33 which are in frictional engagement with the sleeves 31 to prevent leakage of air. By continuing the application of air pressure to the top of the reaction chamber and moving the conduits through the material from the sleeves, substantially all the material may be removed through the reaction chamber.

The particular arrangements shown in the drawings are exemplary of the invention, which is to be considered limited only by the scope of the appended claims.

We claim as our invention:

1. Apparatus for carrying out chemical reactions which comprises a casing having side and top and bottom end walls, upper and lower transverse partitions extending across the casing forming a reaction chamber therebetween for containing a body of contact material and providing an upper and lower fluid manifold with the casing end walls, a set of reactant fluid inlet tubes and a set of reactant fluid outlet tubes extending into the reaction chamber, one of said sets in communication with the lower manifold and the other set in communication with the upper manifold for cooperating in the supply of reactants to and the removal of reaction products from the reaction chamber, heat exchange elements within the reaction chamber, said elements being arranged within the chamber to control the temperature of the major portion of the body of contact material and positioned in spaced relation with the lower transverse partition to provide therewith zones of contact material which are not controlled by the heat exchange elements, apertured areas in one set of said reactant fluid tubes and positioned in a plane adjacent said lower partition, apertured areas in the other set of reactant fluid tubes and positioned in a plane directly above the zones of contact material, said apertured areas cooperating in the passage of reactant fluid through said zones of contact material to maintain the temperature thereof at substantially that of the main body of contact material apertures in the casing side wall directly above the lower transverse partition, removable caps closing said apertures and providing access to the reaction chamber for periodically removing contact material from the chamber.

2. Apparatus for carrying out chemical reactions which comprises a casing having side and top and bottom end walls, upper and lower transverse partitions extending across the casing forming a reaction chamber therebetween for containing a body of contact material and providing an upper and lower fluid manifold with the casing end walls, a set of reactant fluid inlet tubes and a set of reactant fluid outlet tubes extending into the reaction chamber, one of said sets in communication with the lower manifold and the other set in communication with the upper manifold for cooperating in the supply of reactants to and the removal of reaction products from the reaction chamber, heat exchange elements arranged in parallel with the reaction fluid tubes for controlling the temperature of the main body of the contact material, said elements having their lower ends terminating in spaced relation with said lower partition to provide therewith zones of contact material which are not controlled by the heat exchange elements, apertured areas in one set of reactant fluid tubes and positioned in a plane adjacent said lower partition, apertured areas in the other set of reactant fluid tubes and positioned in a plane directly above the lower ends of the heat exchange elements, said apertured areas cooperating in the passage of reactant fluid through said zones of contact material to maintain the temperature thereof at substantially that of the main body of contact material apertures in the casing side wall directly above the lower transverse partition, removable caps closing said apertures and providing access to the reaction chamber for periodically removing contact material from the chamber.

3. Apparatus for carrying out chemical reactions comprising a casing having side and top and bottom end walls, upper and lower transverse partitions extending across the casing forming a closed reaction chamber therebetween for containing a body of contact material and providing an upper and lower chamber with the end walls, an upper tube sheet extending across the casing in spaced relation with said lower partition forming a reactant manifold directly below the reaction chamber, a set of reactant fluid tubes each having an open end communicating through the upper transverse partition with the upper chamber and a closed end positioned adjacent the lower transverse partition, a second set of reactant fluid tubes each having an open end communicating through the lower transverse partition with said reactant manifold and a closed end positioned adjacent the upper transverse partition, a lower plate spaced from the tube sheet and bottom end wall forming therewith respectively, upper and lower heat exchange fluid manifolds, outer nested imperforate tubes extending through said lower partition in symmetrical arrangement, each having a closed end positioned within said reaction chamber and an open end communicating with said upper heat exchange fluid manifold, inner nested tubes each having one open end spaced from the closed end of an outer tube and its other open end communicating with said lower heat exchange fluid manifold through said lower plate, heat exchange elements secured lengthwise to said outer imperforate tubes and radiating therefrom to control the temperature of the major portion of the body of contact material, said elements having their lower ends terminating in spaced relation with the lower transverse partition to provide therewith zones of contact material which are not under control of the heat exchange elements, apertured areas in the first mentioned set of reactant fluid tubes and positioned in a plane above the zones of contact material, apertured areas in the other set of reactant fluid tubes and positioned in a plane adjacent said lower transverse partition, said apertured areas cooperating in the passage of reactant fluid through said zones of contact material to maintain the temperature thereof at substantially that of the main body of contact material apertures in the casing side wall directly above the lower transverse partition, removable caps closing said apertures and providing access to the reaction chamber for periodically removing contact material from the chamber.

ROWLAND S. STANFIELD.
LEONARD W. DOOLAN, Jr.